US010213726B2

United States Patent
Nakagawa et al.

(10) Patent No.: US 10,213,726 B2
(45) Date of Patent: Feb. 26, 2019

(54) $CO_2$ RECOVERY UNIT AND $CO_2$ RECOVERY METHOD

(71) Applicant: Mitsubishi Heavy Industries Engineering, Ltd., Kanagawa (JP)

(72) Inventors: Yosuke Nakagawa, Tokyo (JP); Daisuke Shimada, Tokyo (JP); Tatsuya Tsujiuchi, Tokyo (JP)

(73) Assignee: Mitsubishi Heavy Industries Engineering, Ltd., Kanagawa (JP)

( * ) Notice: Subject to any disclaimer, the term of this patent is extended or adjusted under 35 U.S.C. 154(b) by 0 days.

(21) Appl. No.: 15/397,433

(22) Filed: Jan. 3, 2017

(65) Prior Publication Data

US 2017/0113178 A1  Apr. 27, 2017

Related U.S. Application Data

(63) Continuation of application No. PCT/JP2015/067752, filed on Jun. 19, 2015.

(30) Foreign Application Priority Data

Jul. 10, 2014  (JP) .................................. 2014-142554

(51) Int. Cl.
   *B01D 53/14*   (2006.01)
   *B01D 53/18*   (2006.01)
   (Continued)

(52) U.S. Cl.
   CPC ..... *B01D 53/1412* (2013.01); *B01D 53/1425* (2013.01); *B01D 53/1475* (2013.01);
   (Continued)

(58) Field of Classification Search
   CPC .. B01D 2252/20478; B01D 2258/0283; B01D 53/1412; B01D 53/1425;
   (Continued)

(56) References Cited

U.S. PATENT DOCUMENTS

| | | | | |
|---|---|---|---|---|
| 2012/0167760 | A1* | 7/2012 | Muraoka ............ | B01D 53/1412 95/8 |
| 2013/0333559 | A1* | 12/2013 | Nakagawa ......... | B01D 53/1412 95/24 |
| 2014/0086811 | A1 | 3/2014 | Saito et al. | |
| 2014/0373720 | A1 | 12/2014 | Nakagawa et al. | |

FOREIGN PATENT DOCUMENTS

| | | |
|---|---|---|
| JP | 2011-000527 A | 1/2011 |
| JP | 2011-057485 A | 3/2011 |

(Continued)

OTHER PUBLICATIONS

International Search Report issued in corresponding International Application No. PCT/JP2015/067752 dated Sep. 8, 2015, and English translation thereof (6 pages).

(Continued)

*Primary Examiner* — Cabrena Holecek
(74) *Attorney, Agent, or Firm* — Osha Liang LLP

(57) ABSTRACT

A $CO_2$ recovery unit includes a $CO_2$ absorber in which a gas containing $CO_2$ contacts a $CO_2$-absorbing solution that absorbs the $CO_2$ in the gas; a $CO_2$-absorbing solution regenerator that heats the $CO_2$-absorbing solution that has absorbed the $CO_2$, releases the $CO_2$ from the $CO_2$-absorbing solution, and regenerates the $CO_2$-absorbing solution; and at least one of a $CO_2$ recovery rate controller that controls a difference between an actual measured value and a target value of a recovery rate of the $CO_2$ to be within a predetermined range; and a $CO_2$ recovery amount controller that controls a difference between an actual measured value and a target value of a recovery amount of $CO_2$ to be within a predetermined range.

5 Claims, 4 Drawing Sheets

(51) Int. Cl.
  *B01D 53/34* (2006.01)
  *B01D 53/62* (2006.01)
  *B01D 53/78* (2006.01)
  *F23J 15/04* (2006.01)

(52) U.S. Cl.
  CPC ........... *B01D 53/18* (2013.01); *B01D 53/346* (2013.01); *B01D 53/62* (2013.01); *B01D 53/78* (2013.01); *F23J 15/04* (2013.01); *B01D 2252/20478* (2013.01); *B01D 2256/22* (2013.01); *B01D 2258/0283* (2013.01); *Y02A 50/2342* (2018.01); *Y02C 10/04* (2013.01); *Y02C 10/06* (2013.01); *Y02E 20/326* (2013.01)

(58) Field of Classification Search
  CPC .. B01D 53/1475; B01D 53/18; B01D 53/346; B01D 53/62; B01D 53/78; C01B 31/20
  See application file for complete search history.

(56) References Cited

FOREIGN PATENT DOCUMENTS

| JP | 2012-035214 A | 2/2012 |
| JP | 2012-152731 A | 8/2012 |
| JP | 5237204 B2 | 7/2013 |
| JP | 2013-158685 A | 8/2013 |
| JP | 2014-004525 A | 1/2014 |

OTHER PUBLICATIONS

Written Opinion issued in corresponding International Application No. PCT/JP2015/067752 dated Sep. 8, 2015 (4 pages).
English translation of a Written Opinion dated Sep. 8, 2015, issued by the International Bureau of WIPO, in related International Application No. PCT/JP2015/067752 (6 pages).

* cited by examiner

CO₂ RECOVERY UNIT AND CO₂ RECOVERY METHOD

TECHNICAL FIELD

The present invention relates to a $CO_2$ recovery unit and a $CO_2$ recovery method, for example, a $CO_2$ recovery unit and a $CO_2$ recovery method that recover $CO_2$ in a gas to be treated, using a $CO_2$-absorbing solution.

BACKGROUND

In the related art, $CO_2$ recovery units that recover $CO_2$ exhausted from boilers or the like of thermoelectric power plants are suggested (for example, refer to PTL 1). In the $CO_2$ recovery units, flue gas is introduced into a $CO_2$ absorber, a $CO_2$-absorbing solution is brought into contact with $CO_2$ included in the flue gas so that $CO_2$ is made to be absorbed thereinto. The $CO_2$-absorbing solution that has absorbed $CO_2$ is sent to and heated and decarboxylated in a $CO_2$-absorbing solution regenerator, and thereby, a high-concentration $CO_2$ gas is recovered. The $CO_2$-absorbing solution after the decarboxylation is supplied to the $CO_2$ absorber by a liquid feed pump, and the $CO_2$-absorbing solution is circulated and used between the $CO_2$ absorber and the $CO_2$-absorbing solution regenerator.

CITATION LIST

Patent Literature

[PTL 1] Japanese Patent No. 5237204

SUMMARY

Meanwhile, in the $CO_2$ recovery unit described in PTL 1, the control of maintaining $CO_2$ recovery amount at a target value based on the fluctuations of the gas flow rate of the flue gas, the introduction temperature of the flue gas, and the like from reference values is performed. However, even when the control is performed in this way, it may be difficult to maintain the $CO_2$ recovery amount at the target value due to the influence of a predetermined relational expression used for the control and the precision of a measurement instrument.

One or more embodiments of the invention provide a $CO_2$ recovery unit and a $CO_2$ recovery method with which a $CO_2$ recovery amount and/or a $CO_2$ recovery rate can be controlled with high accuracy toward target values.

A $CO_2$ recovery unit in accordance with one or more embodiments includes a $CO_2$ absorber that brings a gas (i.e., gas to be treated) and a $CO_2$-absorbing solution into contact with each other to cause $CO_2$ included in the gas to be absorbed into the $CO_2$-absorbing solution; a $CO_2$-absorbing solution regenerator that heats the $CO_2$-absorbing solution which has absorbed $CO_2$, releases $CO_2$ from the $CO_2$-absorbing solution, and regenerates the $CO_2$-absorbing solution; a $CO_2$ recovery rate controller that, based on an actual measured value and a target value of a recovery rate of $CO_2$ in the gas, changes a circulation amount of the $CO_2$-absorbing solution to be supplied to the $CO_2$ absorber and changes a supply amount of saturated steam to be supplied to a regeneration heater of the $CO_2$-absorbing solution regenerator to control a difference value between the actual measured value and the target value of the $CO_2$ recovery rate to be within a predetermined range; and a $CO_2$ recovery amount controller that, based on an actual measured value and a target value of a recovery amount of $CO_2$ in the gas, changes the circulation amount of the $CO_2$-absorbing solution to be supplied to the $CO_2$ absorber and changes the supply amount of the saturated steam to be supplied to the regeneration heater of the $CO_2$-absorbing solution regenerator to control a difference value between the actual measured value and the target value of the $CO_2$ recovery amount to be within a predetermined range.

According to this $CO_2$ recovery unit, the circulation amount of the $CO_2$-absorbing solution and the supply amount of the saturated steam to be supplied to the regeneration heater can be appropriately controlled according to changes in the actual measured values of the $CO_2$ recovery rate and the $CO_2$ recovery amount in the gas. Thus, even when there is an influence on a predetermined relational expression to be used for control and the precision of a measuring instrument due to changes in operation condition and the measuring instrument, the $CO_2$ recovery unit that can control the $CO_2$ recovery amount and/or the $CO_2$ recovery rate toward a target value with high accuracy can be realized.

In the $CO_2$ recovery unit, the $CO_2$ recovery rate controller controls the $CO_2$ recovery rate through proportional calculation and integration calculation based on the difference value between the actual measured value and the target value of the $CO_2$ recovery rate.

In the $CO_2$ recovery unit, the $CO_2$ recovery amount controller controls the $CO_2$ recovery amount through proportional calculation and integration calculation based on the difference value between the actual measured value and the target value of the $CO_2$ recovery amount.

In the $CO_2$ recovery unit, the $CO_2$ recovery rate controller includes a first control mode where the circulation amount and the supply amount of the saturated steam are calculated and controlled at any time, and a second control mode where the circulation amount and the supply amount of the saturated steam are calculated and controlled for each predetermined period, and the $CO_2$ recovery amount controller includes a first control mode where the circulation amount and the supply amount of the saturated steam are calculated and controlled at any time, and a second control mode where the circulation amount and the supply amount of the saturated steam are calculated and controlled for each predetermined period.

In the $CO_2$ recovery unit, one of the $CO_2$ recovery rate controller and the $CO_2$ recovery amount controller is caused to be in the first control mode, and the other is caused to be in the second control mode.

In the $CO_2$ recovery unit, the $CO_2$ recovery rate controller is caused to be a first control mode where the circulation amount and the supply amount of the saturated steam are calculated and controlled at any time, the $CO_2$ recovery amount controller is caused to be a first control mode where the circulation amount and the supply amount of the saturated steam are calculated and controlled at any time, and control is performed by providing one of the $CO_2$ recovery amount controller and the $CO_2$ recovery rate controller with a dead band.

A $CO_2$ recovery method in accordance with one or more embodiments includes a process of, in a $CO_2$ absorber, bringing a gas (i.e., gas to be treated) and a $CO_2$-absorbing solution into contact with each other to cause $CO_2$ included in the gas to be absorbed into the $CO_2$-absorbing solution; and a process of, in a $CO_2$-absorbing solution regenerator, heating the $CO_2$-absorbing solution which has absorbed $CO_2$, releasing $CO_2$ from the $CO_2$-absorbing solution, and regenerating the $CO_2$-absorbing solution. Based on an actual measured value and a target value of a recovery rate of $CO_2$ in the gas, a circulation amount of the $CO_2$-absorbing solution to be supplied to the $CO_2$ absorber is changed and a supply amount of saturated steam to be supplied to a regeneration heater of the $CO_2$-absorbing solution regenerator is changed to control a difference value between the actual measured value and the target value of the $CO_2$ recovery rate to be within a predetermined range, and based on an actual measured value and a target value of a recovery amount of $CO_2$ in the gas, the circulation amount of the $CO_2$-absorbing solution to be supplied to the $CO_2$ absorber is changed and the supply amount of the saturated steam to be supplied to the regeneration heater of the $CO_2$-absorbing solution regenerator is changed to control a difference value between the actual measured value and the target value of the $CO_2$ recovery amount to be within a predetermined range.

According to this $CO_2$ recovery method, the circulation amount of the $CO_2$-absorbing solution and the supply amount of the saturated steam to be supplied to the regeneration heater can be appropriately controlled according to changes in the actual measured values of the $CO_2$ recovery rate and the $CO_2$ recovery amount in the gas. Thus, even when there is an influence on a predetermined relational expression to be used for control and the precision of a measuring instrument due to changes in operation condition and the measuring instrument, the $CO_2$ recovery method that can control the $CO_2$ recovery amount and/or the $CO_2$ recovery rate toward the target values with high accuracy can be realized.

In the $CO_2$ recovery method, the $CO_2$ recovery rate is controlled through proportional calculation and integration calculation based on the difference value between the actual measured value and the target value of the $CO_2$ recovery rate.

In the $CO_2$ recovery method, the $CO_2$ recovery amount is controlled through proportional calculation and integration calculation based on the difference value between the actual measured value and the target value of the $CO_2$ recovery amount.

In the $CO_2$ recovery method, the $CO_2$ recovery rate and the $CO_2$ recovery amount are controlled by performing switching between a first control mode where the circulation amount and the supply amount of the saturated steam are calculated and controlled at any time, and a second control mode where the circulation amount and the supply amount of the saturated steam are calculated and controlled for each predetermined period.

In the $CO_2$ recovery method, one of the $CO_2$ recovery rate and the $CO_2$ recovery amount is controlled in the first control mode, and the other is controlled in the second control mode.

In the $CO_2$ recovery method, the $CO_2$ recovery rate and the $CO_2$ recovery amount are controlled in the first control mode, and one of the $CO_2$ recovery amount and the $CO_2$ recovery rate is controlled by providing a dead band.

Accordingly, the $CO_2$ recovery unit and the $CO_2$ recovery method in accordance with one or more embodiments can control the $CO_2$ recovery amount and/or the $CO_2$ recovery rate with high accuracy toward the target values.

DESCRIPTION OF EMBODIMENTS

The present inventors have noted that, in a related-art $CO_2$ recovery unit, even when a $CO_2$ recovery amount and a $CO_2$ recovery rate are controlled to target values obtained based on relationships between $CO_2$ concentration in a gas (i.e., gas to be treated), the flow rate of the gas, and a reference value and a measured value of temperature, the target values and actual measured values may deviate from each other under the influence of measurement accuracy using a relational expression and a measurement instrument that are used for calculation. The present inventors also have found out that the $CO_2$ recovery amount and/or the $CO_2$ recovery rate can be controlled with high accuracy toward the target values by providing controllers for the $CO_2$ recovery amount and the $CO_2$ recovery rate, respectively, to control the $CO_2$ recovery amount and the $CO_2$ recovery rate such that the $CO_2$ recovery amount and the $CO_2$ recovery rate that are actually measured using a gas flowmeter and a gas concentration meter reach the target values.

Hereinafter, embodiments of the invention will be described in detail with reference to the accompanying drawings. However, the invention is not limited to the following embodiments, and can be appropriately changed and carried out. Additionally, the configurations of $CO_2$ recovery units related to the following respective embodiments can be appropriately combined and carried out.

Figure 1:
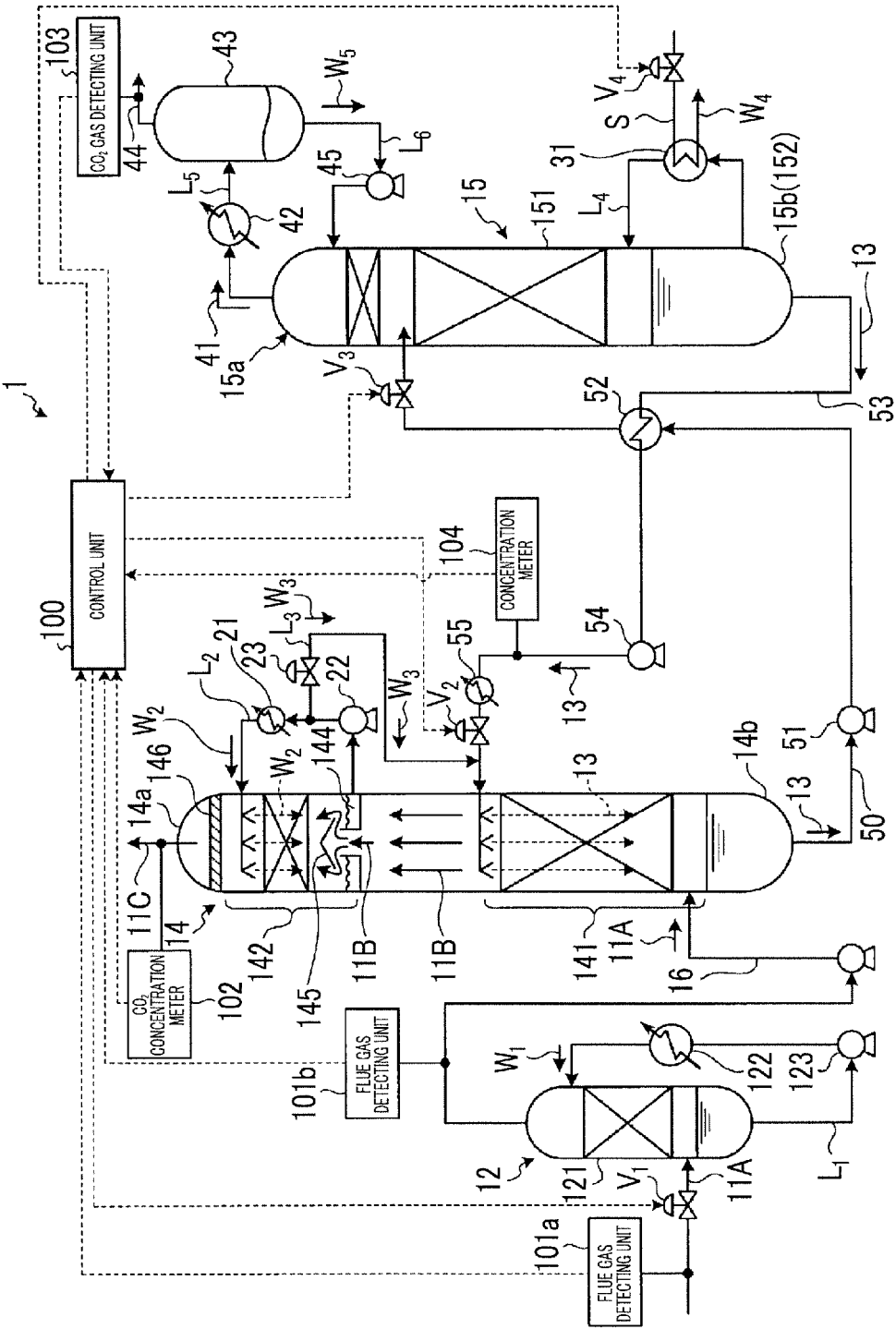
FIG. 1 is a schematic view of a $CO_2$ recovery unit in accordance with one or more embodiments of the invention.

FIG. 1 is a schematic view of a $CO_2$ recovery unit in accordance with one or more embodiments of the invention. As illustrated in FIG. 1, a $CO_2$ recovery unit 1 is an device that absorbs $CO_2$ in a flue gas (an example of a gas to be treated) 11A containing $CO_2$ exhausted from industrial facilities, such as a boiler and a gas turbine, and recovers a high-concentration $CO_2$ gas. The $CO_2$ recovery unit 1 includes a quencher 12 that cools the flue gas 11A containing $CO_2$ exhausted from industrial facilities, such as a boiler and a gas turbine; a $CO_2$ absorber 14 that is provided in a subsequent stage of the quencher 12, brings the cooled flue gas 11A into contact with a $CO_2$-absorbing solution 13, and makes the $CO_2$-absorbing solution 13 absorb and remove $CO_2$ in the flue gas 11A; and a $CO_2$-absorbing solution regenerator 15 that is provided in the subsequent stage of the $CO_2$ absorber 14, releases $CO_2$ from the $CO_2$-absorbing solution 13 that has absorbed the $CO_2$, and regenerates the $CO_2$-absorbing solution 13.

In the $CO_2$ recovery unit 1, the $CO_2$-absorbing solution 13 circulates between the $CO_2$ absorber 14 and the $CO_2$-absorbing solution regenerator 15. The $CO_2$-absorbing solution 13 (lean solution) absorbs $CO_2$ in the $CO_2$ absorber 14, and is supplied to the $CO_2$-absorbing solution regenerator 15 as the $CO_2$-absorbing solution 13 (rich solution). Additionally, the $CO_2$-absorbing solution 13 (rich solution) has substantially all $CO_2$ removed and regenerated in the $CO_2$-absorbing solution regenerator 15, and is supplied to the $CO_2$ absorber 14 as the $CO_2$-absorbing solution 13 (lean solution).

The quencher 12 has a quenching section 121 that cools the flue gas 11A. A circulation line $L_1$ is provided between a bottom part of the quencher 12 and a top part of the quenching section 121. A heat exchanger 122 that cools cooling water $W_1$, and a circulation pump 123 that circulate the cooling water $W_1$ within the circulation line $L_1$ are provided in the circulation line $L_1$.

In the quenching section 121, the flue gas 11A is cooled by bringing the flue gas 11A into countercurrent contact with the cooling water $W_1$. The heat exchanger 122 cools the cooling water $W_1$ heated by the heat exchange with the flue gas 11A. The circulation pump 123 supplies the cooling water $W_1$, which has flowed down to the bottom part of the quencher 12, to the top part of the quenching section 121 via the heat exchanger 122.

The $CO_2$ absorber 14 includes a $CO_2$ absorption section 141 that is provided on a lower part side of the $CO_2$ absorber 14 and has the flue gas 11A cooled in the quencher 12 supplied thereto, a washing section 142 that is provided on an upper part side of the $CO_2$ absorber 14. A liquid storage section 144 that stores cleaning water $W_2$ for cleaning a flue gas 11B from which $CO_2$ has been removed is provided at a bottom part of the washing section 142. A circulation line $L_2$, through which the cleaning water $W_2$, containing the $CO_2$-absorbing solution 13 recovered in the liquid storage section 144, is supplied and circulated from a top part side of the washing section 142, is provided between the liquid storage section 144 and an upper part of the washing section 142. The circulation line $L_2$ is provided with a heat exchanger 21 that cools the cleaning water $W_2$, and a circulation pump 22 that circulates the cleaning water $W_2$, containing the $CO_2$-absorbing solution 13 recovered in the liquid storage section 144, within the circulation line $L_2$ via the heat exchanger 21. Additionally, the circulation line $L_2$ is provided with an extraction line $L_3$ through which a portion of the cleaning water $W_2$ (cleaning water $W_3$) is extracted and supplied to the $CO_2$ absorption section 141. The extraction line $L_3$ is provided with a control valve 23 that adjusts the amount of supply of cleaning water $W_3$ to be supplied to the $CO_2$-absorbing solution 13 (lean solution).

In the $CO_2$ absorption section 141, the flue gas 11A containing $CO_2$ and the $CO_2$-absorbing solution 13 containing alkanolamine or the like come into countercurrent contact with each other. Accordingly, $CO_2$ in the flue gas 11A is absorbed by the $CO_2$-absorbing solution 13 through a chemical reaction shown in the following Formula. As a result, the flue gas 11A containing $CO_2$ becomes the flue gas 11B from which $CO_2$ has been removed by passing through the $CO_2$ absorption section 141.

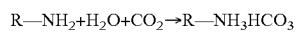

$$R-NH_2+H_2O+CO_2 \rightarrow R-NH_3HCO_3$$

In the washing section 142, the flue gas 11B from which $CO_2$ has been removed rises via a chimney tray 145. Then, the flue gas 11B is brought into gas-liquid contact with the cleaning water $W_2$ supplied from the top part side of the washing section 142, and becomes a flue gas 11C from which the $CO_2$-absorbing solution 13 entrained in the flue gas 11B has been recovered by circulation cleaning. The flue gas 11C is exhausted to the outside from a tower top part 14a of the $CO_2$ absorber 14 after mist in the gas is trapped by a mist eliminator 146.

A rich solution supply tube 50 through which the $CO_2$-absorbing solution 13 (rich solution), which has absorbed $CO_2$ in the $CO_2$ absorber 14, is supplied to an upper part side of the $CO_2$-absorbing solution regenerator 15, is provided between a tower bottom part 14b of the $CO_2$ absorber 14 and an upper part of the $CO_2$-absorbing solution regenerator 15. The rich solution supply tube 50 is provided with a rich solvent pump 51 that supplies the $CO_2$-absorbing solution 13 (rich solution), which has absorbed $CO_2$ in the $CO_2$ absorber 14, toward the $CO_2$-absorbing solution regenerator 15, and a rich-lean solution heat exchanger 52 that heats the $CO_2$-absorbing solution 13 (rich solution) that has absorbed $CO_2$, using the $CO_2$-absorbing solution 13 (lean solution) which has been heated with saturated steam S and from which $CO_2$ has been removed.

The $CO_2$-absorbing solution regenerator 15 includes a $CO_2$-absorbing solution supply part 151 that is provided at a central part of the $CO_2$-absorbing solution regenerator 15 and has the $CO_2$-absorbing solution 13, which has absorbed $CO_2$, supplied thereto, and a mirror surface part 152 of a tower bottom part 15b of a lower part of the $CO_2$-absorbing solution supply part 151.

The tower bottom part 15b of the $CO_2$-absorbing solution regenerator 15 is provided with a circulation line $L_4$ through which the $CO_2$-absorbing solution 13 that has flowed down to the tower bottom part 15b circulates. The circulation line $L_4$ is provided with a regeneration heater 31 that heats the $CO_2$-absorbing solution 13 with saturated steam S.

A tower top part 15a of the $CO_2$-absorbing solution regenerator 15 is provided with a gas exhaust line $L_5$ through which a $CO_2$ gas 41 accompanied by the saturated steam S is exhausted. The gas exhaust line $L_5$ is provided with a condenser 42 that condenses moisture in the $CO_2$ gas 41, and a separation drum 43 that separates the $CO_2$ gas 41 from condensed water $W_5$. A $CO_2$ gas 44 from which the condensed water $W_5$ has been separated is released to the outside from an upper part of the separation drum 43. A condensed water line $L_6$ through which the condensed water $W_5$ separated by the separation drum 43 is supplied to the upper part of the $CO_2$-absorbing solution regenerator 15 is provided between a bottom part of the separation drum 43 and the upper part of the $CO_2$-absorbing solution regenerator 15. The condensed water line $L_6$ is provided with a condensed water circulation pump 45 that supplies the condensed water $W_5$ separated by the separation drum 43 to the upper part of the $CO_2$-absorbing solution regenerator 15.

Additionally, the tower bottom part 15b of the $CO_2$-absorbing solution regenerator 15 and an upper part of the $CO_2$ absorption section 141 of the $CO_2$ absorber 14 are provided with a lean solution supply tube 53 through which the $CO_2$-absorbing solution 13 (lean solution) in the tower bottom part 15b of the $CO_2$-absorbing solution regenerator 15 is supplied to the upper part of the $CO_2$ absorption section 141. The lean solution supply tube 53 is provided with the rich-lean solution heat exchanger 52 that heats the $CO_2$-absorbing solution 13 (rich solution), which has absorbed $CO_2$, using the $CO_2$-absorbing solution 13 (lean solution) which has been heated with saturated steam and from which $CO_2$ has been removed, a lean solution pump 54 that supplies the lean solution in the tower bottom part 15b of the $CO_2$-absorbing solution regenerator 15 to the upper part of the $CO_2$ absorption section 141, and a quenching section 55 that cools the $CO_2$-absorbing solution 13 (lean solution) to a predetermined temperature.

The $CO_2$ recovery unit 1 in accordance with one or more embodiments includes a flue gas detecting unit 101a that is provided in a flow passage for the flue gas 11A to be introduced into the quencher 12, a flue gas detecting unit 101b that is provided in a flow passage for the flue gas 11A exhausted from the quencher 12, a $CO_2$ concentration meter 102 that is provided in a flow passage for the flue gas 11C exhausted from $CO_2$ absorber 14, a $CO_2$ gas detecting unit 103 that is provided in a flow passage for the $CO_2$ gas 44 exhausted from the separation drum 43, and a concentration meter 104 that measures the concentration of the $CO_2$-absorbing solution (lean solution) 13 to be supplied to the $CO_2$ absorber 14.

A flue gas detecting unit 101a measures $CO_2$ concentration in the flue gas 11A to be introduced into the quencher 12, and transmits the measured $CO_2$ concentration to a controller 100. The flue gas detecting unit 101b measures the gas flow rate and the gas temperature of the flue gas 11A exhausted from the quencher 12, and transmits the measured $CO_2$ concentration, gas flow rate, and gas temperature to the controller 100. The $CO_2$ concentration meter 102 detects $CO_2$ concentration in the flue gas 11C exhausted from the $CO_2$ absorber 14, and transmits the detected $CO_2$ concentration to the controller 100.

The $CO_2$ gas detecting unit 103 detects the gas flow rate and the concentration of the $CO_2$ gas 44 exhausted from the separation drum 43, and transmits the gas flow rate and the concentration to the controller 100. The concentration meter 104 measures the concentration of the $CO_2$-absorbing solution (lean solution) 13 to be supplied to the $CO_2$ absorber 14, and transmits the measured concentration of the $CO_2$-absorbing solution (lean solution) 13 to the controller 100.

Figure 2:
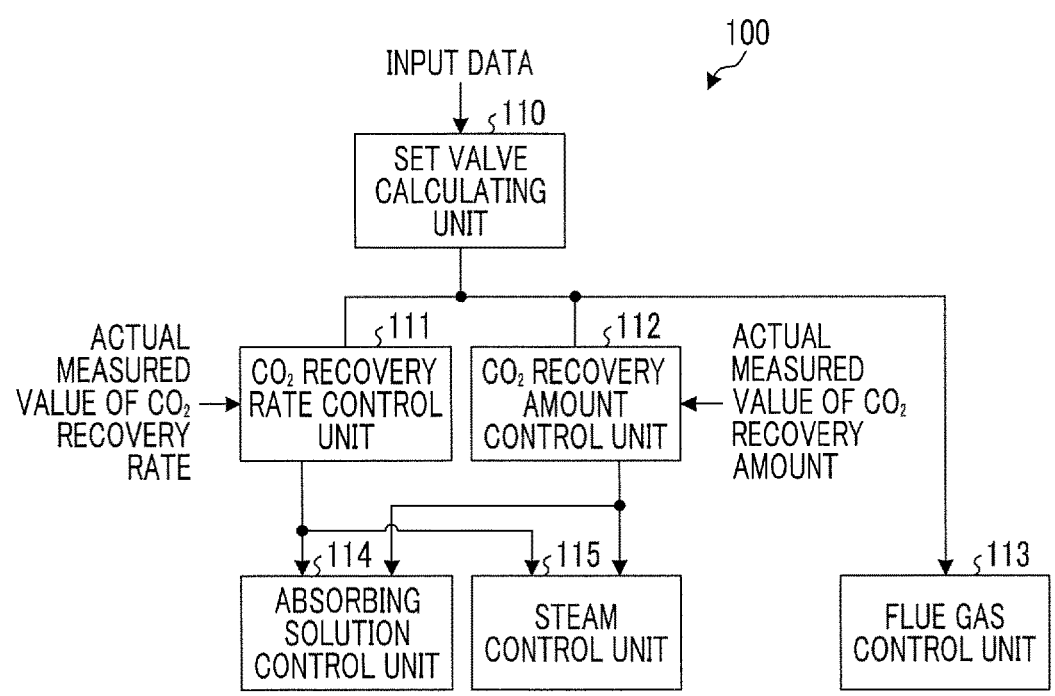
FIG. 2 is a functional block diagram of a controller in accordance with one or more embodiments of the invention.

FIG. 2 is a functional block diagram of the controller 100 in accordance with one or more embodiments. The controller 100 includes a set value calculating unit 110 that calculates set values as various reference values required for the operation of the $CO_2$ recovery unit 1 based on input data, a $CO_2$ recovery rate controller 111 and a $CO_2$ recovery amount controller 112 that correct the set values based on an actual measured value of the $CO_2$ recovery rate of the $CO_2$ recovery unit 1, and calculate corrected data, a flue gas controller 113 that controls the flow rate of the flue gas 11A to be introduced into the quencher 12 via a control valve $V_1$, an absorbing solution controller 114 that controls the liquid amount of the $CO_2$-absorbing solution (lean solution) 13 to be supplied to $CO_2$ absorber 14 via a control valve $V_2$ and controls the liquid amount of the $CO_2$-absorbing solution (rich solution) 13 to be supplied to the $CO_2$-absorbing solution regenerator 15 via a control valve $V_3$, and a steam controller 115 that controls the flow rate of the saturated steam S to be supplied to the regeneration heater 31 via a control valve $V_4$.

The set value calculating unit 110 calculates, according to a predetermined relational expression, a set value of the gas flow rate of the flue gas 11A based on a reference value that is set in advance based on a $CO_2$ recovery rate target value and a $CO_2$ recovery amount target value, the $CO_2$ concentration and gas temperature in the flue gas 11A, and the concentration of the $CO_2$-absorbing solution (lean solution) 13, a set value of the flow rate of the $CO_2$-absorbing solution (lean solution) 13 to be supplied to $CO_2$ absorber 14, a set value of the flow rate of the $CO_2$-absorbing solution (rich solution) 13 to be supplied to $CO_2$-absorbing solution regenerator 15, and a set value of the flow rate of the saturated steam S to be supplied to the regeneration heater 31, and transmits the calculated results to the $CO_2$ recovery rate controller 111, the $CO_2$ recovery amount controller 112, and the flue gas controller 113.

The $CO_2$ recovery rate controller 111 compares the $CO_2$ concentration in the flue gas 11A detected by the flue gas detecting unit 101 and the actual measured value of the $CO_2$ recovery rate measured by the $CO_2$ concentration meter 102 with the set values thereof, and calculates correction values (target values) obtained by calculating the flow rate of the saturated steam S and the flow rate of the $CO_2$-absorbing solution 13 required in order to bring the $CO_2$ recovery rate close to the set values and by correcting the set values. Here, the $CO_2$ recovery rate controller 111 corrects a set value through proportional calculation and integration calculation for the deviation of a difference between the actual measured value and the target value of the $CO_2$ recovery rate. The $CO_2$ recovery rate controller 111 transmits the corrected data to the absorbing solution controller 114 and the steam controller 115 as corrected data.

The $CO_2$ recovery amount controller 112 compares an actual measured value of the $CO_2$ recovery amount measured by the $CO_2$ gas detecting unit 103 with the target value of the $CO_2$ recovery amount, and calculates a correction value (target value) obtained by calculating the flow rate of the saturated steam S and the flow rate of the $CO_2$-absorbing solution 13 required in order to make the $CO_2$ recovery amount reach the target value and by correcting a set value. Here, the $CO_2$ recovery amount controller 112 corrects the set value through proportional calculation and integration calculation for the deviation of a difference between the actual measured value and the target value of the $CO_2$ recovery amount. The $CO_2$ recovery amount controller 112 transmits the corrected data to the absorbing solution controller 114 and the steam controller 115 as corrected data.

The flue gas controller 113 controls the flow rate of the flue gas 11A to be introduced into the quencher 12 via the control valve $V_1$ based on the calculation results of the set value calculating unit 110.

The absorbing solution controller 114 controls the liquid amount of the $CO_2$-absorbing solution (lean solution) 13 to be supplied to the $CO_2$ absorber 14 via the control valve $V_2$ based on the calculation results of the $CO_2$ recovery rate controller 111 and the $CO_2$ recovery amount controller 112, and controls the liquid amount of the $CO_2$-absorbing solution (rich solution) 13 to be supplied to the $CO_2$-absorbing solution regenerator 15 via the control valve $V_3$.

The steam controller 115 controls the flow rate of the saturated steam S to be supplied to the regeneration heater 31 via the control valve $V_4$ based on the calculation results of the $CO_2$ recovery rate controller 111 and the $CO_2$ recovery amount controller 112.

Next, the overall operation of the $CO_2$ recovery unit 1 in accordance with one or more embodiments will be described. The flue gas 11A containing $CO_2$ exhausted from industrial facilities, such as a boiler and a gas turbine, is introduced into the quencher 12, and is brought into countercurrent contact with and cooled by the cooling water $W_1$ after the $CO_2$ concentration, gas flow rate, and temperature in the flue gas 11A are measured by the flue gas detecting unit 101. The cooled flue gas 11A is introduced into the $CO_2$ absorber 14 via a flue 16. The flue gas 11A introduced into the $CO_2$ absorber 14 is brought into countercurrent contact with the $CO_2$-absorbing solution 13 containing alkanolamine or the like in the $CO_2$ absorption section 141, and becomes the flue gas 11B from which $CO_2$ in the flue gas 11A has been absorbed by the $CO_2$-absorbing solution 13 and $CO_2$ has been removed.

The flue gas 11B from which $CO_2$ has been removed rises via the chimney tray 145, is brought into gas-liquid contact with the cleaning water $W_2$ supplied from the top part side of the washing section 142, and becomes the flue gas 11C from which the $CO_2$-absorbing solution 13 entrained in the flue gas 11B has been recovered by circulation cleaning. The $CO_2$ concentration in the flue gas 11C is measured by the $CO_2$ concentration meter 102 and the flue gas 11C is exhausted from the tower top part 14a of the $CO_2$ absorber 14 to the outside, after the mist in the gas is caught by the mist eliminator 146.

The $CO_2$-absorbing solution 13 (rich solution) that has absorbed $CO_2$ is sent to the rich-lean solution heat exchanger 52 by a rich solvent pump 51 via a rich solution supply tube 50 in the $CO_2$ absorber 14. In the rich-lean solution heat exchanger 52, the $CO_2$-absorbing solution 13 (rich solution) sent from the $CO_2$ absorber 14 is heat-exchanged with the $CO_2$-absorbing solution 13 (lean solution) sent from the $CO_2$-absorbing solution regenerator 15. The $CO_2$-absorbing solution 13 (rich solution) after this heat exchange is supplied to the upper part of the $CO_2$-absorbing solution regenerator 15. The $CO_2$-absorbing solution 13 supplied to the $CO_2$-absorbing solution regenerator 15 has $CO_2$ removed therefrom and becomes a semi-lean solution, while flowing down to the tower bottom part 15b via the $CO_2$-absorbing solution supply part 151. This semi-lean solution is circulated through the circulation line $L_4$, is heated by the saturated steam S in the regeneration heater 31, and becomes the $CO_2$-absorbing solution 13 (lean solution). The saturated steam S after being heated becomes the saturated steam condensed water $W_4$. The $CO_2$ gas 41 removed from the $CO_2$-absorbing solution 13 is released to the outside as the $CO_2$ gas 44 from which the condensed water $W_5$ has been separated through the upper part of the separation drum 43 after the moisture thereof is condensed by the condenser 42. In the $CO_2$ gas detecting unit 103, the $CO_2$ concentration in the $CO_2$ gas 44 is measured.

The $CO_2$-absorbing solution 13 (lean solution) of the tower bottom part 15b of the $CO_2$-absorbing solution regenerator 15 is supplied to the upper part of the $CO_2$ absorption section 141 of the $CO_2$ absorber 14 by the lean solution pump 54 after being heat-exchanged with the $CO_2$-absorbing solution 13 (rich solution) by the rich-lean solution heat exchanger 52 via the lean solution supply tube 53.

Figure 3:
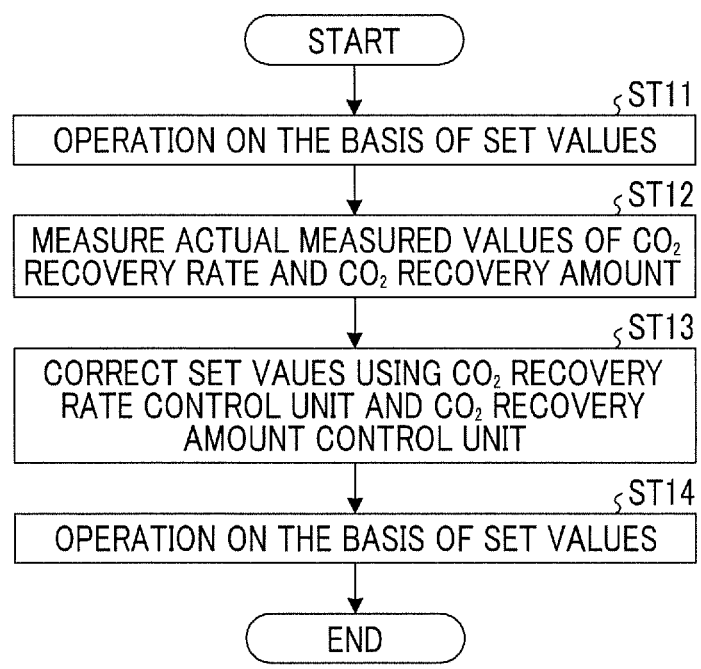
FIG. 3 is a flow chart illustrating a method of controlling a $CO_2$ recovery rate controller and a $CO_2$ recovery amount controller in accordance with one or more embodiments of the invention.

FIG. 3 is a flow chart illustrating a method of controlling the $CO_2$ recovery rate controller 111 and the $CO_2$ recovery amount controller 112 in accordance with one or more embodiments. As illustrated in FIG. 3, the $CO_2$ recovery rate controller 111 controls the operation of the $CO_2$ recovery rate based on the set value of the flow rate of the $CO_2$-absorbing solution 13 based on a reference value that is set in advance based on the $CO_2$ concentration in the flue gas 11A, the flow rate and temperature of the flue gas 11A, and a set value of the flow rate of the saturated steam S to be supplied to the regeneration heater 31, in early stages of the operation of the $CO_2$ recovery unit 1 (Step ST11). Additionally, after elapse of a predetermined period, the $CO_2$ recovery rate controller 111 measures an actual measured value of the $CO_2$ recovery rate using the flue gas detecting unit 101a and the $CO_2$ concentration meter 102, compares the actual measured value of the $CO_2$ recovery rate with the target value thereof (Step ST12), calculates the flow rate of the saturated steam S and the flow rate of the $CO_2$-absorbing solution 13 in order to make the $CO_2$ recovery rate reach the target value, and corrects the set value (Step ST13). The $CO_2$ recovery rate controller 111 controls the $CO_2$ recovery rate based on the set value obtained by correcting the flow rate of the $CO_2$-absorbing solution 13 and the flow rate of the saturated steam S to be supplied to the regeneration heater 31 (Step ST14).

Here, the $CO_2$ recovery rate controller 111 corrects the set value such that the flow rate of the saturated steam S and the flow rate of the $CO_2$-absorbing solution 13 (lean solution) are increased with respect to the set value, for example, when the actual measured value (for example, 85%) of the $CO_2$ recovery rate is lower than the target value (for example, 90%). Accordingly, since the absorbing solution controller 114 increases the flow rate of the $CO_2$-absorbing solution 13 (lean solution) and the steam controller 115 increases the flow rate of the saturated steam S, it is possible to increase the actual measured value of the $CO_2$ recovery rate of $CO_2$ recovery unit 1 toward the target value thereof.

The $CO_2$ recovery amount controller 112 controls the $CO_2$ recovery amount based on the set value of the flow rate of the $CO_2$-absorbing solution 13 based on the reference value that is set in advance based on the $CO_2$ concentration in the flue gas 11A, the flow rate and temperature of the flue gas 11A, and a set value of the flow rate of the saturated steam S to be supplied to the regeneration heater 31, in early stages of the operation of the $CO_2$ recovery unit 1 (Step ST11). Additionally, after elapse of a predetermined period, the $CO_2$ recovery amount controller 112 measures the actual measured value of the $CO_2$ recovery amount using the $CO_2$ gas detecting unit 103, compares the measured actual measured value with the target value (Step ST12), calculates the flow rate of the saturated steam S and the flow rate of the $CO_2$-absorbing solution 13 in order to make the $CO_2$ recovery amount reach the target value, and corrects the set value (Step ST13). Then, the $CO_2$ recovery amount controller 112 controls the $CO_2$ recovery amount based on the set value obtained by correcting the flow rate of the $CO_2$-absorbing solution 13 and the flow rate of the saturated steam S to be supplied to the regeneration heater 31 (Step ST14).

Here, the $CO_2$ recovery amount controller 112 corrects the set value such that the flow rate of the saturated steam S and the flow rate of the $CO_2$-absorbing solution 13 (rich solution) are increased with respect to the set value, for example, when the actual measured value (for example, 85 t/h) of the $CO_2$ recovery amount is lower than the target value (for example, 90 t/h). Accordingly, since the absorbing solution controller 114 increases the flow rate of the $CO_2$-absorbing solution 13 (rich solution) and the steam controller 115 increases the flow rate of the saturated steam S, it is possible to increase the actual measured value of the $CO_2$ recovery amount of $CO_2$ recovery unit 1 toward the target value thereof.

As described above, according to one or more embodiments, the circulation amount of the $CO_2$-absorbing solution 13 and the amount of the saturated steam S supplied to the regeneration heater 31 can be appropriately controlled according to changes in the actual measured values of the $CO_2$ recovery rate and the $CO_2$ recovery amount in the flue gas 11A. Accordingly, even when there is an influence on the predetermined relational expression to be used for the operation control of the $CO_2$ recovery unit and the precision of a measuring instrument due to changes in operation condition and the measuring instrument, the $CO_2$ recovery unit 1 that can control the $CO_2$ recovery amount and/or the $CO_2$ recovery rate to the target values with high accuracy can be realized.

In addition, an example in which both of the $CO_2$ recovery rate controller 111 and the $CO_2$ recovery amount controller 112 are provided, and thus both of the $CO_2$ recovery rate and the $CO_2$ recovery amount are controlled has been described in the above-described embodiments. However, the invention is not limited to this configuration. The $CO_2$ recovery unit 1 may have a configuration including one of the $CO_2$ recovery rate controller 111 and the $CO_2$ recovery amount controller 112. Even in this case, the circulation amount of the $CO_2$-absorbing solution 13 and the amount of the saturated steam S supplied to the regeneration heater 31 can be appropriately controlled according to changes in the actual measured values of the $CO_2$ recovery rate and the $CO_2$ recovery amount. Thus, it is possible to accurately control the $CO_2$ recovery rate and the $CO_2$ recovery amount.

Additionally, an example in which the absorbing solution controller 114 and the steam controller 115 are controlled based on the corrected data that the $CO_2$ recovery rate controller 111 and the $CO_2$ recovery amount controller 112 have corrected has been described in the above-described embodiments. However, the invention is not limited to this configuration. The $CO_2$ recovery unit 1 may control the flue gas controller 113, the absorbing solution controller 114, and the steam controller 115, based on the data obtained by further adding the $CO_2$ concentration in the flue gas 11A and the gas flow rate, temperature, and the like of the flue gas 11A to the corrected data that the $CO_2$ recovery rate controller 111 and the $CO_2$ recovery amount controller 112 have corrected.

Moreover, an example in which the operation of the $CO_2$ recovery unit 1 is controlled using the corrected data of both of the $CO_2$ recovery rate controller 111 and the $CO_2$ recovery amount controller 112 has been described in the above-described embodiments. However, the invention is not limited to this configuration. The $CO_2$ recovery unit 1 may operate one of the $CO_2$ recovery rate controller 111 and the $CO_2$ recovery amount controller 112 in a first control mode where the corrected data is calculated and controlled at any time, and may operate the other in a second control mode where calculation processing is not performed at any time and the calculation processing is performed for each predetermined period. By controlling the operation in this way, the interference between the corrected data can be reduced even when a measurement error or the like has occurred between the calculation processing using the $CO_2$ recovery rate controller 111, and the calculation processing using the $CO_2$ recovery amount controller 112. Thus, it is possible to control the $CO_2$ recovery rate and/or the $CO_2$ recovery amount to the target values with high accuracy.

Figure 4:
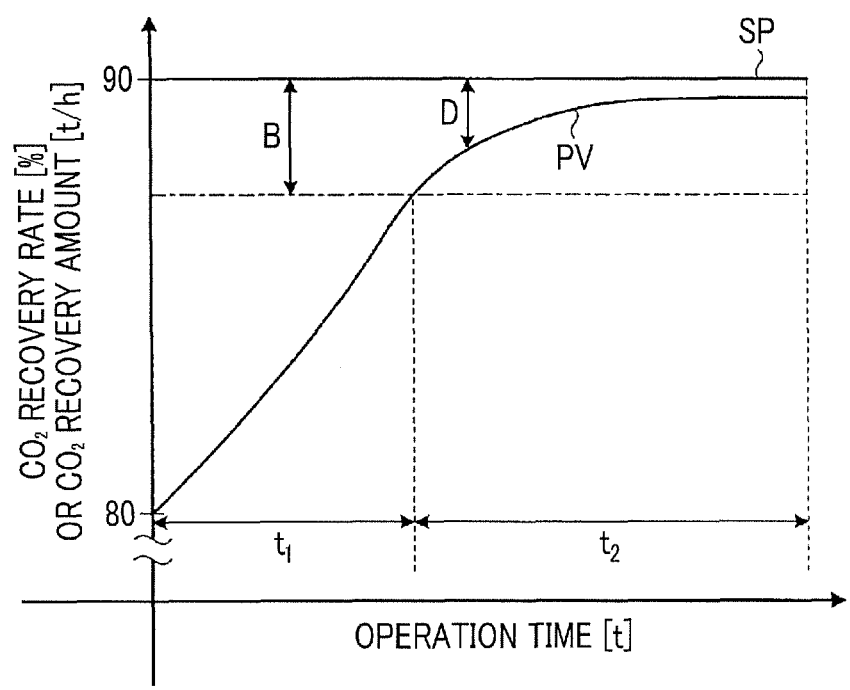
FIG. 4 is a conceptual diagram of an operation control in which a dead band of the $CO_2$ recovery unit in accordance with one or more embodiments of the invention is provided.

Moreover, in then above-described embodiments, an operation control may be performed by providing a dead band, without performing the integration calculation regarding one of the $CO_2$ recovery rate controller 111 and the $CO_2$ recovery amount controller 112. FIG. 4 is a conceptual diagram of an operation control in which a dead band is provided. In addition, in FIG. 4, a horizontal axis represents operation time, and a vertical axis represents $CO_2$ recovery rate (%) or $CO_2$ recovery amount (t/h).

As illustrated in FIG. 4, in one or more embodiments, for example if an operation control is performed such that difference values D between target values (SP) and actual measured values (PV) of the $CO_2$ recovery rate and the $CO_2$ recovery amount fall within a predetermined range by integration calculation based on the following Expression (1), the difference values D gradually decrease with elapse of the operation time t. Thus, when the difference values D between the target values (SP) and the actual measured values (PV) of the $CO_2$ recovery rate (%) or $CO_2$ recovery amount (t/h) have reached a range of operation time t2 smaller than a predetermined range B from the range of the operation time t1, the operation control is performed by proportional calculation by providing a dead band without performing the integration calculation regarding one of the $CO_2$ recovery rate controller 111 and the $CO_2$ recovery amount controller 112. As a result, even when an interference of the corrected data between the $CO_2$ recovery rate controller 111 and the $CO_2$ recovery amount controller 112 occurs, regarding one of the $CO_2$ recovery rate controller 111 and the $CO_2$ recovery amount controller 112, a predetermined offset smaller than an offset (for example, about 2% of a set value of the $CO_2$ recovery unit 1) caused by the interference of the corrected data between the target values (SP) and the actual measured values (PV) of the $CO_2$ recovery rate (%) or the $CO_2$ recovery amount (t/h) can be secured. Accordingly, since it is possible to prevent any interference of the corrected data, the offset caused by the interference of the corrected data at the time of the operation of $CO_2$ recovery unit 1 can be reduced to a range of 0.5% to 1%.

[Expression 1]

$$\text{Out} = k \cdot e + \int \frac{e}{Ti} \quad (1)$$
$$e = SP - PV$$

Additionally, an example in which the flue gas 11A containing $CO_2$ exhausted from industrial facilities, such as a boiler and a gas turbine, is treated by the $CO_2$-absorbing solution 13 has been described in the above-described embodiments. However, as gases that are treated by the $CO_2$-absorbing solution 13, various gases can be applied if they are gases containing $CO_2$.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims. Further, one of ordinary skill in the art would appreciate that the various "units" disclosed herein may be implemented by software or hardware (e.g., circuit).

REFERENCE SIGNS LIST

1: $CO_2$ RECOVERY UNIT
11A, 11B, 11C: FLUE GAS
12: QUENCHER
121: QUENCHING SECTION
122: HEAT EXCHANGER
123: CIRCULATION PUMP
13: $CO_2$-ABSORBING SOLUTION
13S: STEAM
14: $CO_2$ absorber
14a: TOWER TOP PART
14b: TOWER BOTTOM PART
141: $CO_2$ ABSORPTION SECTION
142: WASHING SECTION
144: LIQUID STORAGE SECTION
145: CHIMNEY TRAY
146: MIST ELIMINATOR
15: $CO_2$-ABSORBING SOLUTION REGENERATOR
15a: TOWER TOP PART
15b: TOWER BOTTOM PART
151: $CO_2$-ABSORBING SOLUTION SUPPLY PART
152: MIRROR SURFACE PART
16: FLUE
21: HEAT EXCHANGER
22: CIRCULATION PUMP
23: CONTROL VALVE
31: REGENERATION HEATER
41, 44: $CO_2$ GAS
42: CONDENSER
43: SEPARATION DRUM
45: CONDENSED WATER CIRCULATION PUMP
50: RICH SOLUTION SUPPLY TUBE
51: RICH SOLVENT PUMP
52: RICH-LEAN SOLUTION HEAT EXCHANGER 53: LEAN SOLUTION SUPPLY TUBE
54: LEAN SOLUTION PUMP
55: QUENCHING SECTION
101a: FLUE GAS DETECTING UNIT
101b: FLUE GAS DETECTING UNIT
102: $CO_2$ CONCENTRATION METER
103: $CO_2$ GAS DETECTING UNIT
104: CONCENTRATION METER
111: $CO_2$ RECOVERY RATE CONTROLLER
112: $CO_2$ RECOVERY AMOUNT CONTROLLER
113: FLUE GAS CONTROLLER
114: ABSORBING SOLUTION CONTROLLER
115: STEAM CONTROLLER
$L_1, L_2, L_4$: CIRCULATION LINE
$L_3$: EXTRACTION LINE
$L_5$: GAS EXHAUST LINE
$L_6$: CONDENSED WATER LINE
S: SATURATED STEAM
$W_1$: COOLING WATER
$W_2, W_3$: CLEANING WATER
$W_4$: SATURATED STEAM CONDENSED WATER
$W_5$: CONDENSED WATER

What is claimed is:

1. A $CO_2$ recovery unit comprising:
   a $CO_2$ absorber in which a gas containing $CO_2$ contacts a $CO_2$-absorbing solution that absorbs the $CO_2$ in the gas;
   a $CO_2$-absorbing solution regenerator that heats the $CO_2$-absorbing solution that has absorbed the $CO_2$, releases the $CO_2$ from the $CO_2$-absorbing solution, and regenerates the $CO_2$-absorbing solution; and
   at least one of:
      a $CO_2$ recovery rate controller that controls a difference between an actual measured value and a target value of a recovery rate of the $CO_2$ to be within a predetermined range by changing, based on the actual measured value and the target value of the $CO_2$ recovery rate, a circulation amount of the $CO_2$-absorbing solution to be supplied to the $CO_2$ absorber and a supply amount of saturated steam to be supplied to a regeneration heater of the $CO_2$-absorbing solution regenerator; and
      a $CO_2$ recovery amount controller that controls a difference between an actual measured value and a target value of a recovery amount of $CO_2$ to be within a predetermined range by changing, based on the actual measured value and the target value of the $CO_2$ recovery amount, the circulation amount of the $CO_2$-absorbing solution to be supplied to the $CO_2$ absorber and the supply amount of the saturated steam to be supplied to the regeneration heater of the $CO_2$-absorbing solution regenerator;
   wherein the $CO_2$ recovery rate controller controls the $CO_2$ recovery rate through a proportional calculation and an integration calculation based on the difference between the actual measured value and the target value of the $CO_2$ recovery rate.

2. The $CO_2$ recovery unit according to claim 1,
   wherein the $CO_2$ recovery amount controller controls the $CO_2$ recovery amount through a proportional calculation and an integration calculation based on the difference between the actual measured value and the target value of the $CO_2$ recovery amount.

3. The $CO_2$ recovery unit according to claim 1,
   wherein the $CO_2$ recovery rate controller operates in one of:
      a first control mode where the circulation amount and the supply amount of the saturated steam are calculated and controlled at any time, and
      a second control mode where the circulation amount and the supply amount of the saturated steam are calculated and controlled for each predetermined period, and
   wherein the $CO_2$ recovery amount controller operates in one of:
      a first control mode where the circulation amount and the supply amount of the saturated steam are calculated and controlled at any time, and
      a second control mode where the circulation amount and the supply amount of the saturated steam are calculated and controlled for each predetermined period.

4. The $CO_2$ recovery unit according to claim 3,
   wherein one of the $CO_2$ recovery rate controller and the $CO_2$ recovery amount controller operates in the first control mode, and the other operates in the second control mode.

5. The $CO_2$ recovery unit according to claim 1,
   wherein the $CO_2$ recovery rate controller operates in a first control mode where the circulation amount and the supply amount of the saturated steam are calculated and controlled at any time,
   wherein the $CO_2$ recovery amount controller operates in a first control mode where the circulation amount and the supply amount of the saturated steam are calculated and controlled at any time, and
   wherein one of the $CO_2$ recovery amount controller and the $CO_2$ recovery rate controller is provided with a dead band.

* * * * *